US008985682B2

(12) United States Patent
Billard et al.

(10) Patent No.: US 8,985,682 B2
(45) Date of Patent: Mar. 24, 2015

(54) SUPPORT FOR ONE OR MORE ELEMENTS WHICH ARE INTENDED TO BE FASTENED TO A MOTOR VEHICLE STRUCTURE

(75) Inventors: Xavier Billard, Elancourt (FR); Eric Jouenard, Plaisir (FR); Pascal Nicod, Fontenay-le-Fleury (FR)

(73) Assignee: Renault S.A.S., Boulogne-Billancourt (FR)

( * ) Notice: Subject to any disclaimer, the term of this patent is extended or adjusted under 35 U.S.C. 154(b) by 909 days.

(21) Appl. No.: 12/809,214

(22) PCT Filed: Sep. 26, 2008

(86) PCT No.: PCT/FR2008/051728
§ 371 (c)(1),
(2), (4) Date: Oct. 13, 2010

(87) PCT Pub. No.: WO2009/080921
PCT Pub. Date: Jul. 2, 2009

(65) Prior Publication Data
US 2011/0017878 A1 Jan. 27, 2011

(30) Foreign Application Priority Data

Dec. 20, 2007 (FR) ...................................... 07 60105

(51) Int. Cl.
*B60J 7/00* (2006.01)
*B60R 16/02* (2006.01)

(52) U.S. Cl.
CPC ................................... *B60R 16/0215* (2013.01)
USPC .......... 296/208; 296/209; 296/202; 296/97.23

(58) Field of Classification Search
USPC .......... 248/65, 71, 73, 74.1, 49; 296/199, 208, 296/209, 146.9, 181.2, 202, 187.09, 205, 296/203.02, 97.23
See application file for complete search history.

(56) References Cited

U.S. PATENT DOCUMENTS

| | | | | |
|---|---|---|---|---|
| 3,622,195 A * | 11/1971 | Lautenbach | ................. | 296/35.1 |
| 4,007,536 A * | 2/1977 | Soderberg | ................... | 29/421.1 |
| 4,440,434 A * | 4/1984 | Celli | .......................... | 296/181.2 |
| 5,288,121 A * | 2/1994 | Graves | ....................... | 296/146.9 |
| 5,613,327 A * | 3/1997 | Sauve | ......................... | 49/490.1 |
| 5,846,091 A | 12/1998 | Nishijima et al. | | |
| 5,902,007 A * | 5/1999 | Koester et al. | ................ | 296/209 |
| 6,062,633 A * | 5/2000 | Serizawa | ...................... | 296/199 |
| 6,722,729 B2 * | 4/2004 | Yoshida et al. | .......... | 296/187.09 |
| 8,534,744 B2 * | 9/2013 | Turicik et al. | .............. | 296/146.9 |
| 8,668,253 B2 * | 3/2014 | Bauer | .......................... | 296/199 |
| 2004/0108421 A1 | 6/2004 | Yuta et al. | | |

FOREIGN PATENT DOCUMENTS

| | | |
|---|---|---|
| EP | 1 415 863 | 5/2004 |
| FR | 2 897 808 | 8/2007 |

* cited by examiner

*Primary Examiner* — Todd M Epps
(74) *Attorney, Agent, or Firm* — Oblon, McClelland, Maier & Neustadt, L.L.P.

(57) ABSTRACT

A support for one or more elements intended to be fastened to a front pillar of a motor vehicle so that the one or more elements can be supported along the structure. The support includes: at least one mechanism guiding and retaining cables, at least one mechanism fastening a trim of the structure, at least one mechanism indexing a carpet, and at least one mechanism fastening an electrical connector.

10 Claims, 3 Drawing Sheets

SUPPORT FOR ONE OR MORE ELEMENTS WHICH ARE INTENDED TO BE FASTENED TO A MOTOR VEHICLE STRUCTURE

TECHNICAL FIELD

The present invention relates to a support for one or more element(s) intended to be fastened to a motor vehicle structure in order to support them along this structure. More specifically, the structure is a motor vehicle front hinge pillar and the elements are electrical cables, electrical connectors, controls or the like.

It should be noted that the word "cable" used in this application is to be understood in its broadest sense, that is to say that it indifferently denotes an electrical cable, a strand formed of several associated electrical conductors, a hybrid cable comprising one or more optical fibers and one or more electrical conductors, an optical fiber or a collection of optical fibers, or even a rigid or semi rigid pipe used to carry a fluid.

It should also be noted that the term "front hinge pillar" used in the present application denotes a metallic structure contributing to the strength of the bodywork, situated at the front of each of the sides of the body shell of a vehicle, and which supports the hinges of a front door. The front hinge pillar acts a bearing structure for some of the members of the vehicle.

In a motor vehicle, a series of electric cables is used to supply power, distribute electricity, and transmit data to the constituent parts of the engine. The new standards on the fitting of electrical connectors force the motor manufacturers to fit the connectors on the front hinge pillars of the vehicles. The desired quality and dependability of the electrical connections have considerably increased the number of connectors that have to be installed.

Because the front hinge pillar region is very cramped, installing and securing the elements in this region is highly compromised. This region generally comprises the control for opening the hood at the front so as to gain access to the engine, the front hinge pillar trim fasteners, the passages for the cables, the optional front and rear electrical connections and the passage hole for the electrical branch off for a front door. This region is reputed to be difficult in terms of assembly and in terms of design.

PRIOR ART

FIG. 1 illustrates the current situation in the front hinge pillar 2: it shows the passage hole 10 for the electrical branch off for a front door, the control for opening the hood 12, electrical connectors 14 and cables 16, amongst other things.

At the present time, the elements in the front hinge pillar region are fastened directly to the sheet metal work, generally in the following order, each step being liable to give rise to risks of disconnection, damaging and breakage of the cables. The steps are notably:

1) Passing the electrical branch off for the door through the hole in the sheet metal work 10 and the fitting of an associated blanking piece,
2) The fastening of wiring branch offs and of electrical connectors to the sheet metal work using clips. At this stage, the operator may reverse the path thus causing a quality defect.
3) The fitting of the front hood control and the screwing-down of the wiring already fitted, with compression thereof. This represents a risk of noise and of increased effort required to operate the hood-opening control, if the cable becomes stressed or twisted.
4) The fitting of a carpet intended for the vehicle interior, the carpet having no means of maintaining its geometry. This then represents additional work for the operator in ensuring that the carpet does not shift during assembly.
5) The fitting of the front hinge pillar trim manipulating the wiring already in situ so as to clear access to the intended fastening points. At this stage, there is a risk of a quality defect and risk of noise.

It is difficult to maintain the geometry of the front hinge pillar trim because the latter is secured using long fixing studs stemming directly from the trim so that the preceding elements can be stacked behind it.

SUMMARY OF THE INVENTION

Thus, the invention sets out to overcome all of the above-mentioned disadvantages by offering a front hinge pillar region arrangement that is an improvement over the prior art. An assembly line operator sees his work become easier through use of the support according to the invention.

The invention achieves its objective by virtue of a support for one or more element(s) intended to be fastened to a motor vehicle front hinge pillar in order to support them along said structure, characterized in that the support comprises:
   at least one cable guiding and holding means,
   at least one fastening means for securing a trim of said structure,
   at least one indexing means for indexing a carpet, and
   at least one fastening means for securing an electrical connector.

Advantageously, the invention may also have one or more of the following features:
   the support may further comprise accepting means for accepting a control for opening the hood at the front of a vehicle,
   the accepting means that accept the hood-opening control may be positioned on the upper part of the support so as to minimize environmental constraints with the other elements,
   the cable guiding and holding means may be produced in the form of a substantially U-shaped groove,
   one end of one leg of said U may comprise a plate mounted such that it can rotate about an axis so that the plate moves from an open position in which the groove is open so that a cable can be inserted into a closed position in which the plate closes the groove in order to hold said cable in position,
   the carpet indexing means may be in the form of a cylinder projecting from the base surface of the support on which the carpet is geometrically positioned before it is definitively fitted,
   the fastening means for securing a trim of said structure may be positioned laterally on the support,
   the fastening means for securing a trim of said structure may be in the form of recesses able to accept a corresponding element stemming from the trim such as a fastening finger, said fastening finger being designed to secure said trim,
   the cable guiding means and the connectors associated with said cables may have a similar means of identification so as to encourage the correct layout of the cables and of the connectors in their associated guide means on the support,
   the means of identification may be a visual one and may, for example, be a color,
   it may be positioned at the lower part of the front hinge pillar, it may be made of a synthetic organic material such as polypropylene.

BRIEF DESCRIPTION OF THE FIGURES

Further features and advantages of the invention will become clearly apparent from reading the following description in association with the attached figures in which.

DETAILED DESCRIPTION OF PREFERRED EMBODIMENTS

Figure 1:
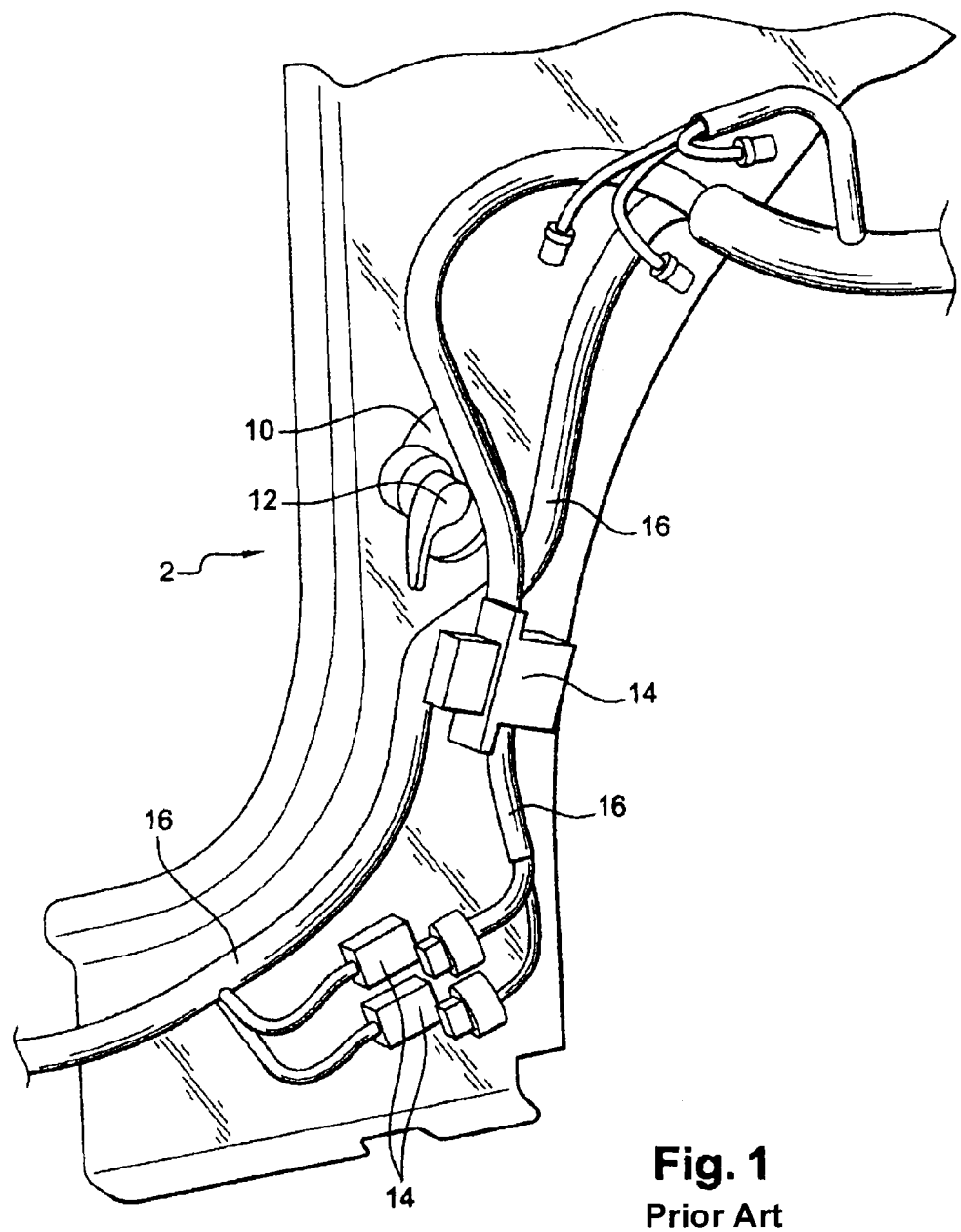
FIG. 1 is a perspective view of a prior solution depicting the lower part of a motor vehicle front hinge pillar.

In the description which will follow, elements that are identical, similar or analogous will be denoted by the same reference numerals.

Moreover, for all of the figures and throughout the description which follows, one and the same notation denotes one and the same element. Likewise, in what follows, "upper" will denote a face of an element that is directed vertically toward the top of the vehicle, that is to say toward the underside of the seat cushion and "lower" will denote any opposite face to said "upper" face.

The following description is confined to the front hinge pillar fitted to the left-hand part of a motor vehicle, in relation to the driver of the vehicle, in the knowledge that the right front hinge pillar is the symmetrical counterpart of the left front hinge pillar with respect to the natural plane of symmetry of the structure of the vehicle and therefore to a multipurpose support intended to be fastened to this front hinge pillar.

Figure 3:
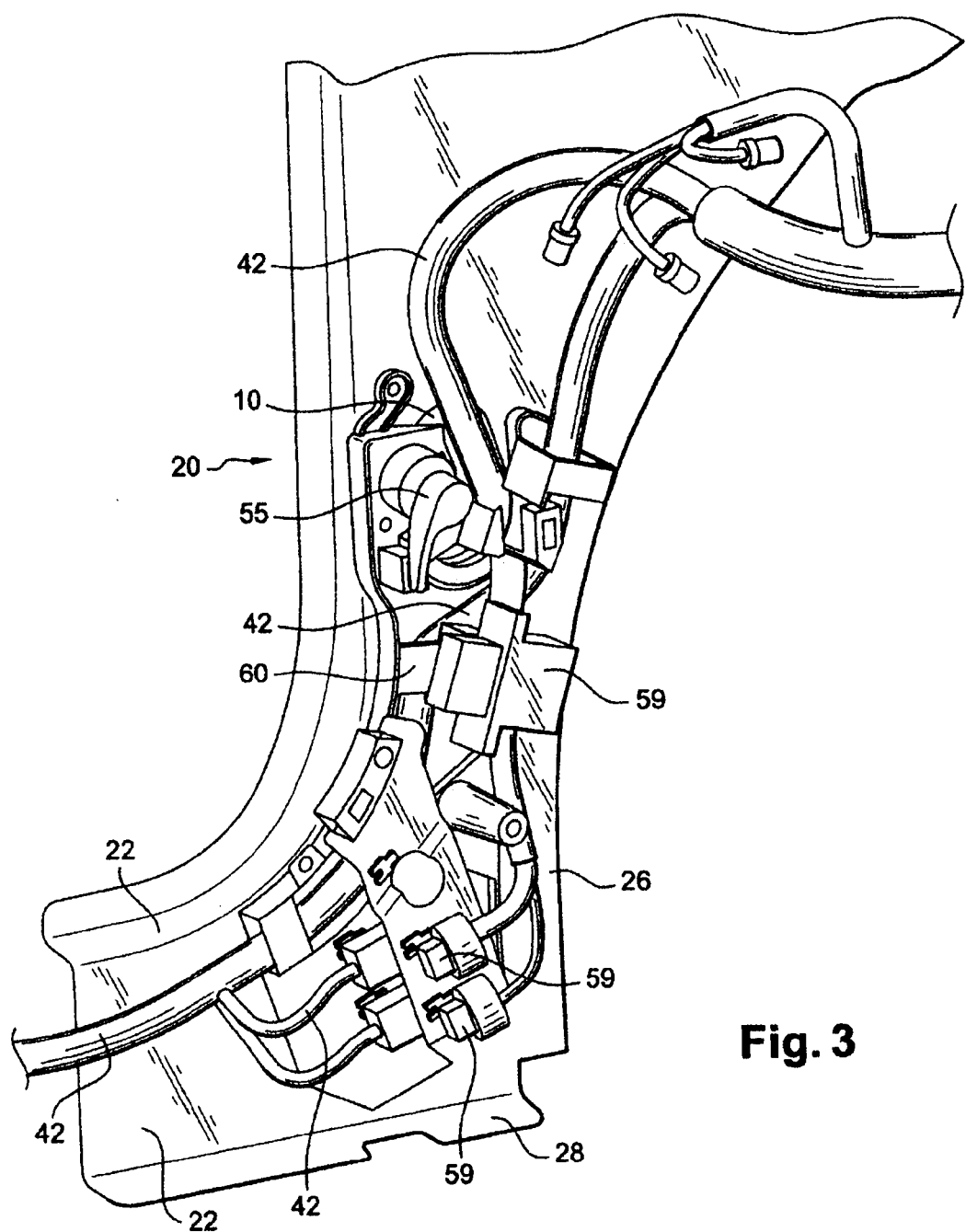
FIG. 3 is a perspective view of the support according to the invention secured to the front hinge pillar of a motor vehicle.

The front hinge pillar 20 as depicted in FIG. 3 is preferably made as a single metal casting in light metal, notably aluminum, or an alloy of light metals, notably an aluminum alloy. It is made up of a central body which is substantially L-shape with a cross section of generally U-shaped appearance. The leg of the "L" is made of a base wall 22, and of a first 24 and a second 26 side wall. The foot of the "L" is made up of the continuation of the base wall 22 and of the first side wall 24, and of a third side wall 28.

Figure 2:
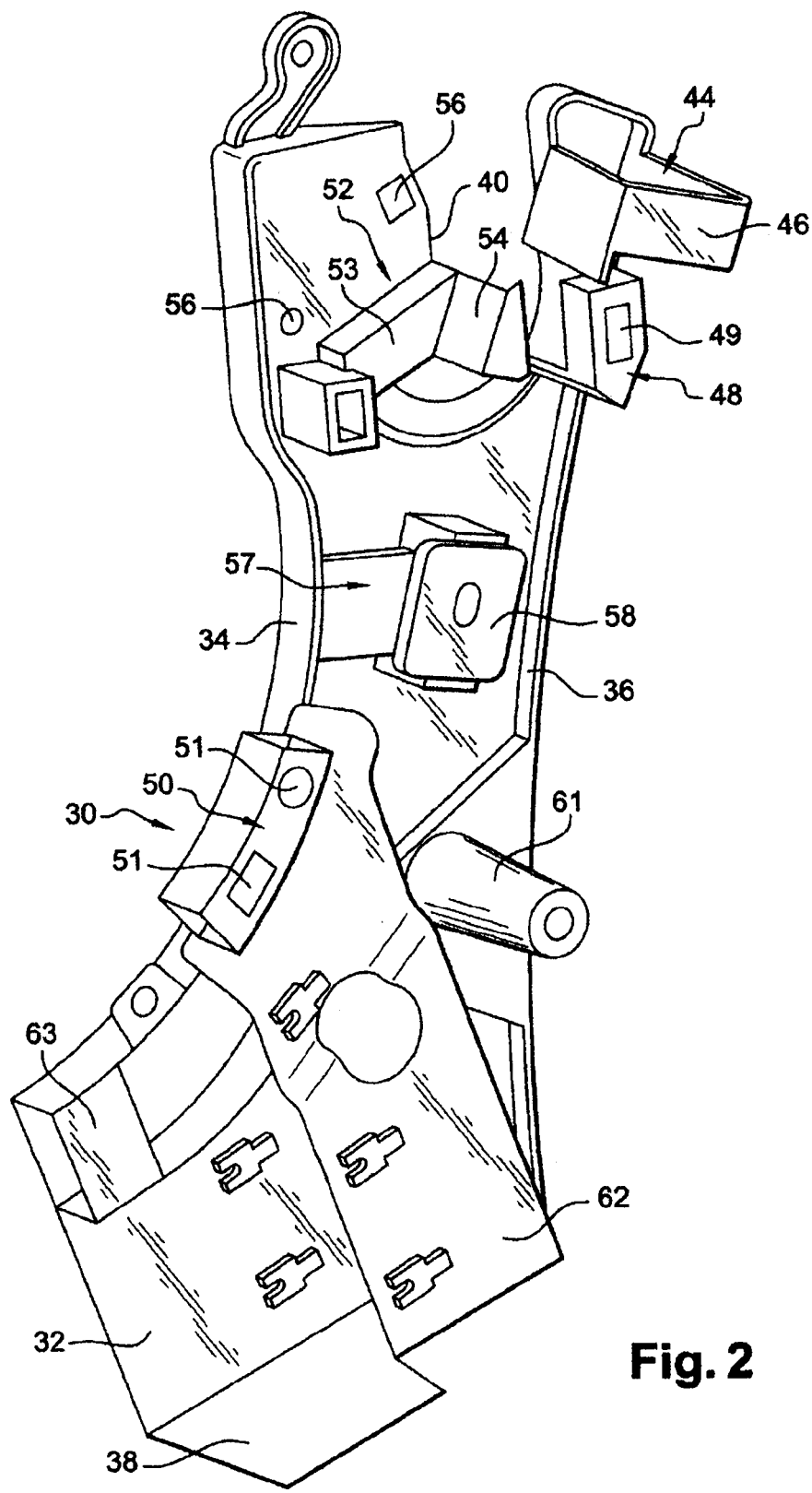
FIG. 2 is a perspective view of the support according to the invention intended to be fastened to the front hinge pillar of a motor vehicle.

The support 30 according to the invention and illustrated in FIG. 2 has substantially the same shape and is fastened by means known to those skilled in the art at the lower region of the front hinge pillar 20. It notably has a central body which is substantially L-shaped with a cross section of U-shaped general appearance. The dimensions of the central body are smaller than the dimensions of the front hinge pillar 20 in the embodiment illustrated in FIG. 3.

The leg of the "L" is made up of a base wall 32 and of a first 34 and a second 36 side wall. The foot of the "L" is made up of the continuation of the base wall 32 and of the first side wall 34, and of a third side wall 38.

In the upper half, the support 30 has a central cutout 40 that is substantially U-shaped so as to suit the structural environment of the front hinge pillar 20 and which divides the upper end of the support into two parts.

The first part adjacent to the wall 36 comprises a cable guiding and holding means. It is in the form of a substantially U-shaped groove 44 projecting from the base wall 32, one end of one branch of said "U" of which comprises a plate 46 able to rotate about an axis so that the plate moves from an open position in which the groove is open so that a cable can be inserted into a closed position in which the plate closes the groove to hold the cable 42 in position.

Positioned beneath this groove 44 there is a left front hinge pillar trim (not depicted) fastening means 48. By way of explanation, a trim is a plastic component that makes the interior space of a vehicle more attractive, the aforementioned trim being able in part to conceal all the elements arranged on the support 30. The fastening means 48 is in the form of a recess 49 able to accept a corresponding element (not depicted) stemming from the trim, such as a finger forcibly immobilized in the recess, said fastening finger being suited to securing said trim. Another fastening means for securing the trim is arranged on this support and, more specifically, in the elbowed region of the "L". It comprises two distinct recesses 51 which are likewise capable of accepting a finger for forcibly immobilizing the trim, in each of the recesses 51 of the support. Thus, the trim fastening means 48, 50 are positioned laterally on the support 30.

The second part adjacent to the wall 34 comprises a cable 42 guiding and holding means 52 that has a baseplate 53 and a wall 54 projecting from the surface of the baseplate. The wall 54 thus guides the cable along the support 30.

Positioned above the means 52 are means for accepting the control 55 for opening the hood (not depicted) at the front of a vehicle. Traditionally, this control 55 is produced in the form of a substantially "crescent-shaped" lever that has to be pulled toward the person operating it in order, via a cable, to release the hood. The accepting means in this embodiment are recesses 56 for accepting elements that make up the control. More specifically, one of the recesses contains a nut. The nut may also be molded into the support. The two recesses 56 are positioned one on each side of the second part adjacent to the wall 34. Advantageously, positioning the hood-opening control some way up makes it possible to avoid environmental constraints which are constraints due to the electrical wiring which may twist or increase the effort involved in operating the cable that allows the hood to be opened. What is more, positioning the hood-opening control some way up makes it possible to avoid the noisiness that is due to the movement of the hood-opening cable against surrounding electrical cables.

Finally, in this upper half of the support is a cable 42 guiding and holding means 57 coupled to a fastening means 58 for securing an electrical connector 59. The two means 57 and 58 are adjacent and positioned under the cutout 40. The guiding and holding means 57 as previously described is in the form of a groove that can be closed using a plate 60. FIG. 3 clearly illustrates that the cable 42 is held in position under the plate 60.

Where the upper half and the lower half of the support 30 meet, substantially in the middle with respect to the general structure of the support, there is an indexing means 61 for indexing a carpet (not depicted). The abovementioned carpet is the one that will be positioned in the vicinity of the driver's seat and will therefore cover the floor associated with the driver's seat. This means 61 is in the form of a tube projecting from the main wall 32 of the support. The shape is chosen so that it occupies the least possible amount of space on the support so as not to impede the passage of the various elements held on the support. The free end of the tube has a round opening to accommodate a carpet indexing element, for example an immobilizing finger.

An operator will therefore have to position an immobilizing finger associated with the carpet in the opening of the tube 61 in order to maintain the geometry of the carpet before it is definitively secured.

Numerous means 58 of fastening electrical connectors 59 are positioned in the lower half of the support 30. More specifically, a plate 62 positioned between the elbowed region of the "L" (the region in which the trim fastening means 50 are also located) and the third side wall 38. For example, according to the embodiment here, three connectors 59 may be fastened to the plate 62. The plate thus has a first function of supporting connectors and also performs an additional function of holding a cable. Specifically, the plate 62 is offset height-wise in relation to the base wall 32 so as to free up enough space into which cables 42 can be laid and held in position under it. Additional fastening means 58 are positioned at the main wall 32 of the support 30 lower down than the plate 62. It should be noted that the fastening means for securing the connectors 59 consist of any means known to those skilled in the art for securing an electrical connector to a surface.

Finally, at the lower end of the support, a guiding and holding means 63 adjacent to the wall 34 has, like the guiding and holding means 42, the shape of a substantially U-shaped groove projecting from the base wall 32 one end of one branch of said "U" having a plate 63 able to rotate about an axis so that the plate moves from an open position in which the groove is open so that a cable can be inserted into a closed position in which the plate closes the groove to hold the cable 42 in the held position.

Thus, the various elements present in the front hinge pillar region are distributed over the entire height of the support so as to avoid constraints and interferences with the environment.

Thus, an operator wishing to use the support according to the invention will mount the various elements in this order:
1) Passing the electrical branch off for the door through the hole in the sheet metal work 10 and fitting an associated blanking piece,
2) Fastening the wiring branch offs and the electrical connectors in the grooves provided. The grooves containing the cables and the connectors associated with said cables comprise a similar means of identification so as to encourage correct layout of the cables and of the connectors in their associated groove on the support. The means of identification may, for example, be visual, such as a color code.
3) Fitting the hood control some way up so as to avoid environmental constraints and noise.
4) Fitting a carpet intended for the vehicle interior. This then has the advantage of preventing the carpet from shifting during assembly and of making the operator's work easier.
6) Fitting the front hinge pillar lining using fastening means over which he has control and which are offset in the height-wise direction. This makes it possible to avoid the use of long fastening studs stemming directly from the lining and that allows the preceding elements to be stacked up behind one another, and the risks of noise and quality defects.

The present invention is not in any way restricted to the embodiment described and illustrated which has been given merely by way of example. On the contrary, the invention encompasses all technical equivalents of the means described and combinations thereof where these are made in accordance with its spirit.

Thus the layout of the various functions of the support may differ in cases where the front hinge pillar of the vehicle is subjected to a different stress distribution.

The support of the invention therefore allows an optimized arrangement of the elements located in the vicinity of a motor vehicle front hinge pillar so as to facilitate assembly, optimize assembly times, improve the noisiness of the vehicle, the risks of disconnection, damage, breakage of cables and the overall geometric quality of the front hinge pillar.

The invention claimed is:

1. A support for one or more elements intended to be fastened to a motor vehicle front hinge pillar to support the one or more elements along the front hinge pillar, the support comprising:
    at least one cable guiding and holding means for guiding and holding a cable;
    at least one fastening means for securing a trim of the front hinge pillar;
    at least one indexing means for indexing a carpet; and
    at least one fastening means for securing an electrical connector.

2. The support as claimed in claim 1, wherein the support further comprises accepting means for accepting a control for opening a hood at a front of the vehicle.

3. The support as claimed in claim 2, wherein the accepting means accepts the hood-opening control and is positioned on an upper half of the support so as to minimize environmental constraints with other elements.

4. The support as claimed in claim 1, wherein the cable guiding and holding means is in a form of a substantially U-shaped groove.

5. The support as claimed in claim 4, wherein one end of one leg of the U-shaped groove comprises a plate mounted to rotate about an axis so that the plate moves from an open position in which the groove is open so that the cable can be inserted into a closed position in which the plate closes the groove to hold the cable in position.

6. The support as claimed in claim 1, wherein the carpet indexing means is in a form of a cylinder projecting from a base surface of the support on which the carpet is geometrically positioned before the carpet is definitively fitted.

7. The support as claimed in claim 1, wherein the fastening means for securing a trim of the front hinge pillar is positioned laterally on the support.

8. The support as claimed in claim 7, wherein the fastening means for securing a trim of the front hinge pillar is in a form of recesses configured to accept a corresponding element stemming from the trim or a fastening finger, the fastening finger configured to secure the trim.

9. The support as claimed in claim 1, wherein the support is positioned at a lower part of the front hinge pillar.

10. The support as claimed in claim 1, wherein the support is made of a synthetic organic material or of polypropylene.

* * * * *